(12) United States Patent
Bonfiglio et al.

(10) Patent No.: US 11,580,073 B2
(45) Date of Patent: Feb. 14, 2023

(54) MULTIDIRECTIONAL SYNCHRONIZATION OF CLOUD APPLICATION DATA

(71) Applicant: SYNCARI, INC., Dover, DE (US)

(72) Inventors: Nick Bonfiglio, Scottsdale, AZ (US); Neelesh Shastry, Fremont, CA (US)

(73) Assignee: Syncari, Inc., Dover, DE (US)

( * ) Notice: Subject to any disclaimer, the term of this patent is extended or adjusted under 35 U.S.C. 154(b) by 281 days.

(21) Appl. No.: 16/878,413

(22) Filed: May 19, 2020

(65) Prior Publication Data

US 2021/0365410 A1 Nov. 25, 2021

Related U.S. Application Data

(60) Provisional application No. 62/901,640, filed on Sep. 17, 2019.

(51) Int. Cl.
*G06F 16/178* (2019.01)
*G06F 16/182* (2019.01)
*G06F 16/17* (2019.01)

(52) U.S. Cl.
CPC ........ *G06F 16/178* (2019.01); *G06F 16/1734* (2019.01); *G06F 16/182* (2019.01)

(58) Field of Classification Search
None
See application file for complete search history.

(56) References Cited

U.S. PATENT DOCUMENTS

| | | | |
|---|---|---|---|
| 9,728,008 B2 * | 8/2017 | Soon-Shiong | G06T 19/006 |
| 9,762,435 B2 * | 9/2017 | Shelton | G06F 11/3072 |
| 10,917,471 B1 * | 2/2021 | Karumbunathan | H04L 67/1097 |

OTHER PUBLICATIONS

Halevy, Alon, et al., "Data Integration: The Teenage Years", ACM VLDB '06, pp. 9-16. (Year: 2006).*
Chard, Kyle, et al., "Efficient and Secure Transfer, Synchronization, and Sharing of Big Data", IEEE (2014) Secure Big Data in the Cloud, pp. 46-55. (Year: 2014).*

(Continued)

*Primary Examiner* — Scott A. Waldron
(74) *Attorney, Agent, or Firm* — Hickman Becker Bingham Ledesma LLP

(57) ABSTRACT

In embodiments, application data is received from multiple application platforms. Once received, an object mapping is used to determine a synchronization data object that is mapped to data objects from the application data. A function mapping is used to determine one or more functions to apply to the application data. Data objects from the application data that are mapped to the synchronization data object are compared to detect conflicts between fields. In response to detecting a conflict, the conflict is resolved based on configuration rules that indicate priority between fields of different data objects. Once the conflict is resolved, the data objects are merged into a modified synchronization data object that represents an updated version of the synchronization data object. Changes between the synchronization data object and the modified synchronization data object are identified and propagated to application platforms to perform updates to application data managed by the application platforms.

20 Claims, 5 Drawing Sheets

(56) References Cited

OTHER PUBLICATIONS

Ebert, Nico, et al., "Integration Platform as a Service", Springer (2017), Bus Inf Syst Eng 59(5), pp. 375-379. (Year: 2017).*
Sahal, Radhya, et al., "Big data and stream processing platforms for Industry 4.0 requirements mapping for a predictive maintenance use case", Elsevier (2020), Journal of Manufacturing Systems 54, pp. 138-151. (Year: 2020).*

* cited by examiner 302　　　304　　　306　　　308

FIG. 4

Receive application data comprising a plurality of data objects associated with a plurality of application platforms, the plurality of data objects comprising a first data object associated with a first application platform of the plurality of application platforms and a second data object associated with a second application platform of the plurality of application platforms
402

↓

Use an object mapping to determine that the first data object and the second data object are mapped to a synchronization data object, the synchronization data object comprising a master data object that is configured to represent a synchronized state of the first data object and the second data object
404

↓

Use a function mapping to determine a first set of one or more functions that are mapped to the first data object and the second data object and in response, apply the first set of one or more functions to the first data object and the second data object
406

↓

Detect a conflict between one or more fields of the first data object and one or more fields of the second object and in response, resolve the conflict based on configuration rules
408

↓

Merge the first data object and second data object into a modified synchronization data object that represents an updated version of the synchronization data object
410

↓

Use the function mapping to determining a second set of one or more functions that are mapped to the modified synchronization data object and in response, apply the second set of one or more functions to the to the modified synchronization data object
412

↓

Transmit at least one of: one or more modifications of the first data object to the first application platform and one or more modifications of the second data object to the second application platform
414

400

MULTIDIRECTIONAL SYNCHRONIZATION OF CLOUD APPLICATION DATA

BENEFIT CLAIM

This application claims the benefit under 35 U.S.C. § 119(e) of provisional application 62/901,640, filed Sep. 17, 2019, the entire contents of which are hereby incorporated by reference for all purposes as if fully set forth herein.

FIELD OF THE DISCLOSURE

One technical field of the present disclosure is computer-implemented systems and methods for synchronizing data between cloud-based application platforms. Yet another technical field is computer-implemented machine learning algorithms and techniques.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Cloud based application platforms provide application programs that are capable of providing useful functionality to end users. For example, Zendesk provides application programs that collect all customer support requests from a wide range of sources and manages them in one location. Salesforce provides application programs for managing customer information and applying such information to sales related tasks. Marketo provides application programs that provide marketing automation software that helps organizations automate and measure marketing engagement, tasks and workflows.

Application platforms create and store application data. In general, application data is data that is created and managed by an application platform. Application data is commonly organized into data objects that represent a group of related pieces of data. An example of application data is an account data object. An account data object may define fields such as: a key field storing a unique identifier for an account; a revenue field indicating a revenue associated with an account; an address field that stores an address associated with an account; and any other fields pertaining to or relating to an account associated with an application platform.

Another example of a data object associated with an application platform is a ticket data object. A ticket data object represents a work item or issue within an application platform. By way of example, a ticket data object may define the following fields: a project field storing a project to which an issue belongs; a key field storing a unique identifier for a ticket; a description field storing a description of a ticket and actions taken with respect to the ticket; a status field indicating the stage a ticket is currently at in its lifecycle; an assigned person field indicating who (if anyone) a ticket has been assigned to.

Application platforms can integrate with other application platforms and share application data such as account and ticket data objects through application programing interfaces (APIs) provided by each platform. A cluster of application platforms synchronize application data between platforms using peer to peer synchronization techniques. Such techniques require each platform of a cluster of platforms to transmit and receive data to and from each member platform of a synchronization cluster, resulting in tremendous amounts of computing resources spent transmitting, receiving, and processing data to perform synchronization. Additionally, due to the difficulties relating to synchronizing application between multiple platforms, application data is left underutilized.

Techniques are desired to efficiently synchronize application data between multiple application platforms and to provide useful insights and applicability from synchronized data.

SUMMARY

The appended claims may serve as a summary of the invention.

BRIEF DESCRIPTION OF THE DRAWINGS

FIG. 4 illustrates a programmable algorithm or method for multi-directional synchronization of application data between application platforms, according to an embodiment.

DETAILED DESCRIPTION

Figure 1:
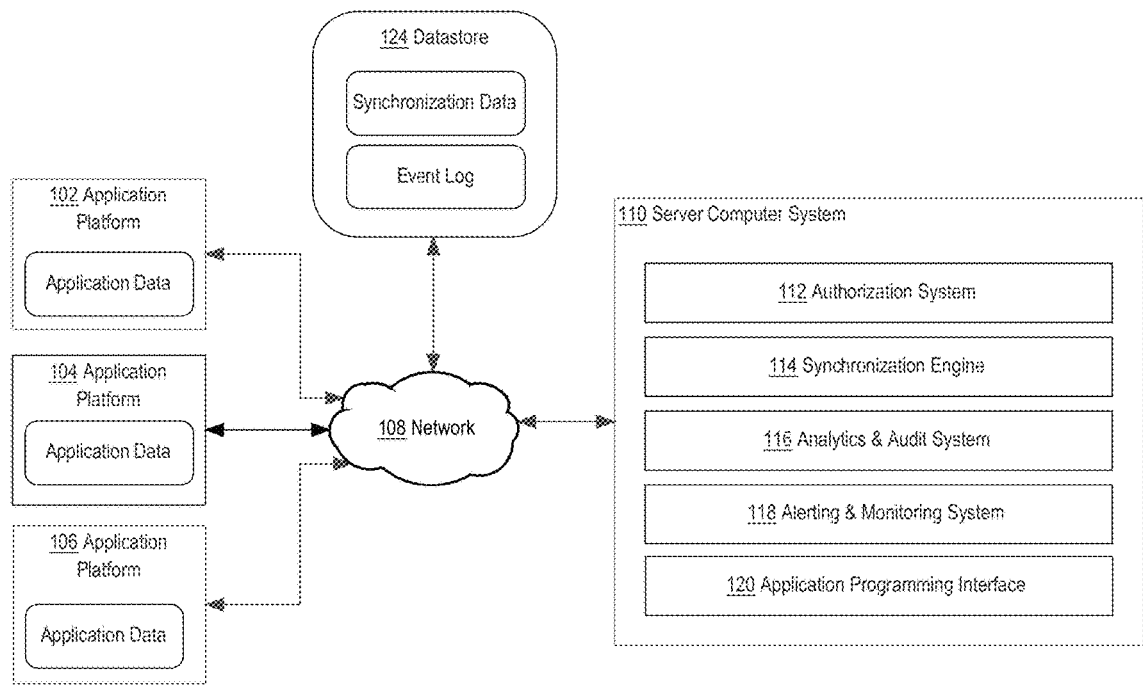
FIG. 1 illustrates an example computer system, according to an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

The text of this disclosure, in combination with the drawing figures, is intended to state in prose the algorithms that are necessary to program a computer to implement the claimed inventions, at the same level of detail that is used by people of skill in the arts to which this disclosure pertains to communicate with one another concerning functions to be programmed, inputs, transformations, outputs and other aspects of programming. That is, the level of detail set forth in this disclosure is the same level of detail that persons of skill in the art normally use to communicate with one another to express algorithms to be programmed or the structure and function of programs to implement the inventions claimed herein.

Embodiments are described in sections below according to the following outline:

1. OVERVIEW
2. EXAMPLE COMPUTER SYSTEM IMPLEMENTATION
3. EXAMPLE FUNCTIONAL IMPLEMENTATION
4. HARDWARE OVERVIEW
5. EXTENSIONS AND ALTERNATIVES

1. Overview

Systems and methods are provided for multi-directional synchronization of application data between application platforms. Application data is received from multiple application platforms. Application data includes data objects that are associated with the multiple application platforms. In some embodiments, the application data includes a first data object associated with a first application platform and a second data object associated with a second application platform that is distinct from the first application platform.

Once the application data is received, an object mapping that maps data objects from application data to data objects from synchronization data is used to determine synchronization data objects that are mapped to data objects from the application data. Each synchronization data object comprises a master data object that is configured to represent a synchronized state of one or more data objects from the multiple application platforms. For example, a particular synchronization data object represents a synchronized state of the first data object and the second data object and includes one or more fields that correspond to one or more fields of the first data object and one or more fields of the second data object.

A function mapping is used to determine a first set of one or more functions that is mapped to data objects from the application data. The first set of one or more functions is then applied to the data objects from the application data. For example, the function mapping is used to determine a first set of one or more functions mapped to the first data object and the second data object and then apply the first set of one or more functions to the first data object and the second data object.

Data objects from the application data that are mapped to the same synchronization data object are compared to detect conflicts between fields. In response to detecting a conflict, the conflict is resolved based on configuration rules that indicate priority between fields of different data objects. For example, a conflict may be detected between one or more fields of the first data object and one or more fields of the second object because the first data object and second data object are mapped to the same synchronization data object. In response, the conflict is resolved based on configuration rules.

Data objects from the application data are merged into modified synchronization data objects that represent an updated version of the respective synchronization data objects. For example, in response to detecting a conflict between the first data object and second data object, the first data object and second data object are merged into a modified synchronization data object that represents an updated version of the particular synchronization data object.

The function mapping is used to determine a second set of one or more functions that are mapped to synchronization data objects. In some embodiments, the second set of one or more functions includes a machine learning based function. The second set of one or more functions is then applied to the synchronization data objects. For example, the function mapping is used to determine a second set of one or more functions mapped to the modified synchronization data object and then apply the second set of one or more functions to the modified synchronization data object.

The synchronization data object and the modified synchronization data object are compared to identify changes between the synchronization data object and the modified synchronization data object. The changes are recorded in a transaction log. The transaction log is used to generate one or more modifications encapsulated by API calls or functions that, when transmitted and executed, perform updates to data objects at various application platforms. For example, one or more modifications of the first data object may be generated and transmitted to the first application platform and one or more modifications of the second data object may be generated and transmitted to the second application platform.

Using techniques discussed herein, an efficient synchronization process that synchronizes application data between multiple application platforms is provided. Using a synchronization engine as a point of centrality between multiple application platforms allows application platforms to minimize the amount of API calls to other application platforms to perform synchronization of application data. Instead of an application platform communicating individually with each application platform of multiple application platforms to perform synchronization, techniques discussed herein only require that an application platform communicate with a single centralized synchronization engine. These techniques result in a significant reduction in API calls and other computing resources devoted to performing synchronization of application data between multiple application platforms.

2. Example Computer System Implementation

FIG. 1 illustrates a computer system that may be used to implement an embodiment of an application synchronization system. In the example of FIG. 1, a plurality of application platforms 102, 104, 106 are coupled via network 108 to a server computer system 110. Any number of application platforms 102, 104, 106 may be used and three (3) are shown in FIG. 1 merely for purposes of providing an illustrative example. Each application platform 102, 104, 106 may comprise a mobile computing device, desktop computer, laptop computer, or server computer. Each application platform 102, 104, 106 is capable of receiving input via a keyboard, pointing device or other input-output device, has a visual data display device, and one or more network interfaces that are capable of communication with network 108. In an embodiment, each application platform 102, 104, 106 may comprise a cloud based application platform that functions as software as a service (SaaS) or any other type of cloud computing platform. Some examples of application platforms 102, 104, 106 include SalesForce, ZenDesk, Marketo, etc.

In one embodiment, each application platform 102, 104, 106 executes at least an application program that is capable of creating and storing application data. In general, application data comprises data that is created and managed by an application platform 102, 104, 106. Application data comprises structured data such as application specific data objects and fields and field values associated with data objects. Application data may also include application specific metadata such as transaction data that indicates transaction information about data objects managed by an application platform.

Application data can be contrasted with other categories of data such as file data and infrastructure data. While application data is structured and application specific, files are mostly unstructured. For example, file data such as a word document file is primarily comprised of unstructured text.

In some embodiments, application data may be specific to a user account associated with an application platform. Application data associated with an application platform may comprise one or more data objects and associated application metadata. Application data for each application platform 102, 104, 106 is stored in a datastore in association with the respective application platform 102, 104, 106.

An example of a data object associated with an application platform 102, 104, 106 is an account data object. Each application platform 102, 104, 106 may include a representation of an account data object. For example, an account data object may define fields such as: a key field storing a unique identifier for an account; a revenue field indicating a revenue associated with an account; an address field that stores an address associated with an account; and any other fields pertaining to or relating to an account associated with an application platform.

Another example of a data object associated with an application platform 102, 104, 106 is a ticket data object. A ticket data object represents a work item or issue within a respective application platform. By way of example, a ticket data object may define the following fields: a project field storing a project to which an issue belongs; a key field storing a unique identifier for a ticket; a description field storing a description of a ticket and actions taken with respect to the ticket; a status field indicating the stage a ticket is currently at in its lifecycle; an assigned person field indicating who (if anyone) a ticket has been assigned to; a severity field storing the severity of a ticket (e.g. critical, major, minor, etc.); a priority field storing the priority of a ticket at a general level (e.g. very high, high, medium, low, very low); and a rank field storing a rank value in respect of a ticket (defining a rank order of the ticket relative to other tickets).

Different types of data objects are commonly found in many application platforms. An example of a commonly found data object is an account data object. Nearly every application platform stores a version of an account data object that organizes and stores data associated with an account. However, different application platforms may include less fields, more fields, or different field names for the same type of account data object compared to other application platforms.

In one embodiment, each application platform 102, 104, 106 executes at least an application that is capable of transmitting and receiving application data via network 108. Transmitting and receiving application data may include transmitting and receiving data comprising updates to application data to and from the server computing system 110.

The network 108 broadly represents any combination of one or more local area networks, wide area networks, campus networks and/or internetworks. Packet-switched networks may be used with networking infrastructure devices such as switches and routers that are programmed to communicate packet data based on internet protocol (IP), a transport protocol such as TCP or UDP, and higher-order protocols at any of several different logical layers, such as those defined by the Open Systems Interconnect (OSI) multi-layer internetworking model.

Server computer system 110 may comprise one or more cores, processors, computers, and/or virtual machine instances hosted on the premises of an enterprise or using a public or private cloud computing facility.

In an embodiment, server computer system 110 hosts or executes an authorization system 112, which is illustrated as a single functional element in FIG. 1 but may be organized using a plurality of different computer programs, processes or other software elements. The authorization system 112 is a computer-executed system that may be arranged to perform authentication and authorization techniques such as providing role based access control and password and token based authentication. The authorization system 112 is programmed or configured to control access to other software components of the server computing system 110 such as a user interface (not shown in FIG. 1), application programming interface 120, synchronization engine 114, etc. The authorization system 112 is programmed or configured to setup, control, and manage access to application platforms 102, 104, 106 as a means of facilitating data exchanges between components of the server computer system 110 and application platforms 102, 104, 106. The authorization system 112 is programmed or configured to store and expose SAML 2.0 and Oauth 2.0 interfaces to facilitate authentication and authorization protocols. The authorization system 112 may be further programmed or configured to store a record of all identified application communication and access events in an event log stored in datastore.

In an embodiment, server computer system 110 hosts or executes analytics and audit system 116, which is illustrated as a single functional element in FIG. 1 but may be organized using a plurality of different computer programs, processes or other software elements. The analytics and audit system 116, is a computer-executed system that may be arranged to perform data analysis to generate and transmit reports, heatmaps, auditing functions and additional predictive and descriptive data analysis functions. The analytics and audit system 116 is programmed or configured to listen or query for different types of events on event log and aggregate the event data into a data warehouse for reporting purposes. The analytics and audit system 116 is programmed or configured to listen or query for metadata manipulation events on event log and store the metadata manipulation event data in datastore. The analytics and audit system 116 is programmed or configured to provide query APIs as an interface to query for aggregate data and audit reports.

In an embodiment, server computer system 110 hosts or executes alerting and monitoring system 118, which is illustrated as a single functional element in FIG. 1 but may be organized using a plurality of different computer programs, processes or other software elements. The alerting and monitoring system 118, is a computer-executed system that may be arranged to perform alerting and monitoring functions and interface with external monitoring computer systems such as Pager Duty, Cloud Watch, or Stackdriver. The alerting and monitoring system 118 is programmed or configured to listen or query for errors/failures and latency events on event log. The alerting and monitoring system 118 is programmed or configured to match queried events against alerting rules to generate alert event data, and store generated alert event data in the datastore. The alerting and monitoring system 118 is programmed or configured to listen or query for alert events on event log and forward the queried alert events to configured external monitoring systems such PagerDuty, CloudWatch or StackDriver. The alerting and monitoring system 118 is programmed or configured to provide query APIs to facilitate private monitoring utilities to periodically poll for alert event data.

In one embodiment, datastore 124 may be any suitable storage device such as one or more hard disk drives, memories, or any other electronic digital data recording device configured to store data. Although datastore 124 is depicted as a single device in FIG. 1, datastore 124 may span multiple devices located in one or more physical locations. For example, datastore 124 may be one or more nodes of one or more data warehouse(s). Additionally, in one embodiment, datastore 124 may be located on the same device(s) as server computer 110. Alternatively, datastore 124 may be located on a separate device(s) from server computer 110. Additionally, datastore 124 may be located on each client device associated with a computing system, such as an enterprise or work computing system. Any combination of the above may be used.

Datastore 124 may include one or more databases implemented using any suitable methodology, such as a relational database, a columnar database, etc. The database may be of any size, portioned into any number of rows, columns, or tables, and may be organized in any manner. In a multitenant embodiment, data stored on datastore 124 may relate to any number of different tenants, such as hundreds to thousands of tenants or more depending on resource capacity and throughput. The data stored on datastore 124 may relate to any type of data. Individual data records may have any number of fields, components, or other aspects.

In an embodiment, server computer system 110 hosts or executes a synchronization engine 114, which is illustrated as a single functional element in FIG. 1 but may be organized using a plurality of different computer programs, processes or other software elements. The synchronization engine 114 is a computer-executed system that may be arranged to synchronize application data between application platforms 102, 104, 106. In an embodiment, synchronization engine may be configured to integrate with external application platforms 102, 104, 106 to receive and transmit data such as application and/or synchronization data. Synchronization engine 114 may include API based integrations facilitated by the application programming interface 120 to receive application data from application platforms 102, 104, 106. Received application data may be stored in datastore 124, in temporary storage within synchronization engine 114, and/or be processed by different components of server computer system 110. Synchronization engine 114 may also perform data manipulation operations on received application data which may include operations that convert application data into synchronization data. Synchronization engine 114 may store synchronization data in datastore 124 comprising updated records of application data from application platforms 102, 104, 106.

Figure 2:
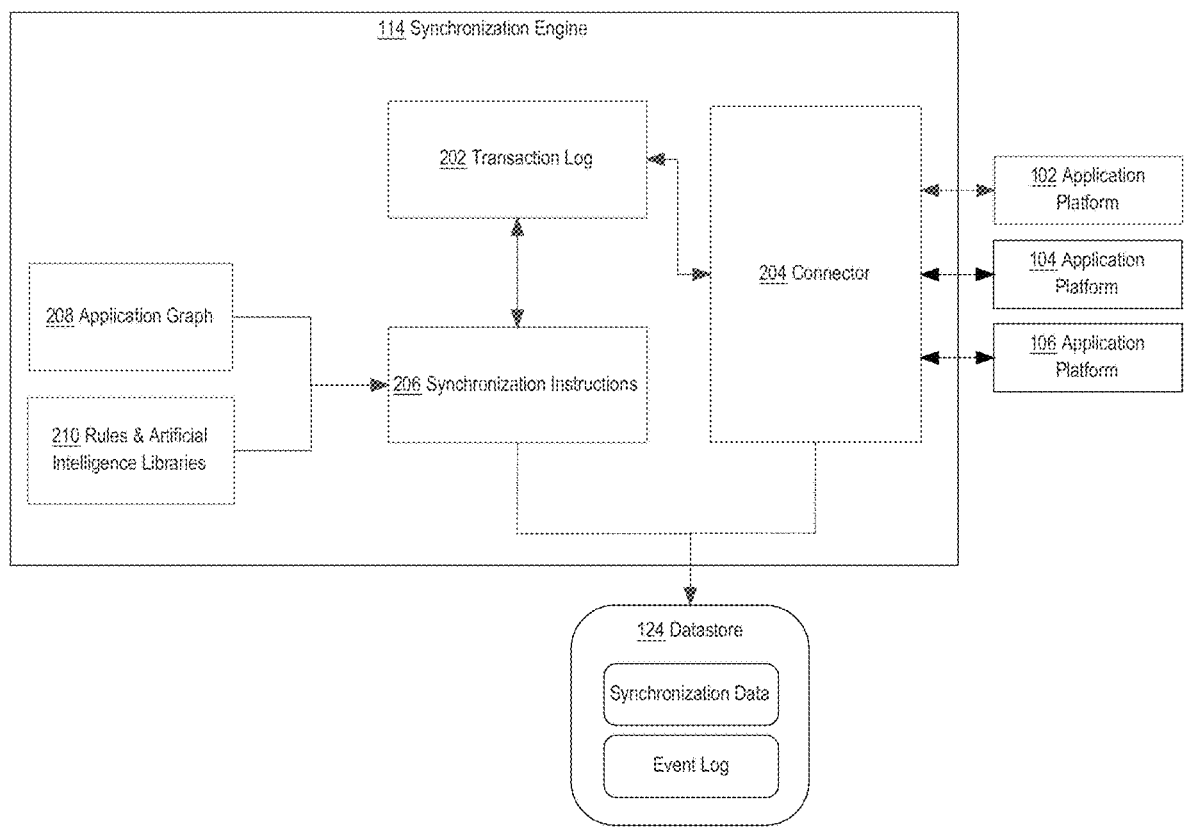
FIG. 2 illustrates a synchronization engine for synchronizing application data between application platforms, according to an embodiment.

FIG. 2 illustrates a synchronization engine 114 that may be used to synchronize application data between application platforms. In the example of FIG. 2, a plurality of application platforms 102, 104, 106 are coupled via network 108 (not shown) to connector 204. Connector 204 may comprise software instructions programmed or configured to interface with application platforms 102, 104, 106 and receive application data from application platforms 102, 104, 106. Connector 204 may comprise software instructions programmed or configured to transmit synchronization data to application platforms 102, 104, 106. Connector 204 may comprise software instructions programmed or configured to store transaction data including application data and/or data that indicates changes to application data in transaction log store 202. Connector 204 may comprise software instructions programmed or configured to write event data to event log.

Transaction log 202 may store data that indicates incoming changes from external systems such as application platforms 102, 104, 106 and may also store data that indicates changes that have to be applied to application data stored in external systems such as application platforms 102, 104, 106.

Application graph 208 may store data that represents a graph of all connected application platforms 102, 104, 106. The graph may include, for each application platform 102, 104, 106, metadata from data objects that are stored in each respective system. The graph may include mappings between fields of data objects from different application platforms 102.

Rules & artificial intelligence libraries 210 may store data that represents rules or logic that can be applied by the synchronization instructions 206 to application data or synchronization data. Rules & artificial intelligence libraries 210 may store data that specifies configuration rules that indicate priority between fields of data objects of different application platforms. Rules & artificial intelligence libraries 210 may store data that implements machine learning functions such as neural network functions, classifier functions, natural learning processing, or other machine learning functions and may be imported, statically or dynamically linked, called or programmatically integrated into or coupled to the synchronization instructions 206 using other means. In an embodiment, rules & artificial intelligence libraries 210 comprise the TensorFlow system, which is publicly available under open-source licensing.

Synchronization instructions 206 may comprise software instructions programmed or configured to perform flow 400 of FIG. 4. For example, synchronization instructions 206 may programmed or configured to synchronize application data between application platforms 102, 104, 106. Synchronization instructions 206 may further comprise software instructions programmed or configured to read or receive application data from the transaction log, interface with the application graph 208 and rules & artificial intelligence libraries 210 to determine changes to synchronization and application data, create synchronization data, modify synchronization and application data, and transmit modifications and updates to application platforms 102, 104, 106.

When multiple application platforms are connected to the synchronization engine 114, the synchronization instructions 206 perform a synchronization process. A synchronization process may preliminary include creating and storing synchronization data in datastore 124. Synchronization data comprises one or more synchronization data objects that are each associated with one or more data objects from application data of application platforms 102, 104, 106. For example, synchronization data may include an account synchronization data object that corresponds to similar account data objects from different application platforms 102, 104, 106.

Synchronization data may be created in multiple ways. In one embodiment, synchronization data is created by being manually defined by a system administrator with knowledge of the types of structure of data objects from different application platforms 102, 104, 106. In another embodiment, the synchronization data is created by synchronization instructions 206 generating synchronization data based on application data received from different application platforms 102, 104, 106. This may be achieved by identifying different types of data objects exist in different application platforms 102, 104, 106 and copying the structure of such data objects to the synchronization data.

The purpose of synchronization data is to store an updated state of corresponding data objects that exist in different application platforms 102, 104, 106. Thus, in addition to synchronization data, an object mapping is stored that maps each data object from the synchronization data to one or more data objects from application data of application platforms 102, 104, 106. A function mapping may also be stored that include one or more functions that are mapped to the one or more data objects from application data of application platforms 102, 104, 106 and or one or more data object from synchronization data managed by server computer 110. An object or function mapping can be created by a system administrator or privileged user and stored in datastore 124.

For example, synchronization data may include an account synchronization data object that includes data fields such as Name, Email, Address and corresponding field values. Each application platform 102, 104, 106 may store application data that includes an account data object that includes data fields such as Name, Email, Address and corresponding field values. A mapping is stored that maps the account from the synchronization data to each of the user account data objects from the different application platforms 102, 104, 106. The mapping may also include field mappings that map fields from the account from the synchronization data to fields from each of the account data objects from the different application platforms 102, 104, 106.

As another example, application data from application platform 102 may store an organization data object that includes data fields such as Name, Email, Revenue and corresponding field values. Application data from application platform 104 may store an account data object that includes data fields such as Name, Email, Address and corresponding field values. Although the organization data object and account data object may be slightly different in how each data object is defined, the organization data object and account data object from application platforms 102, 104, respectively, may be mapped to the same data object from the synchronization data.

A function mapping is stored that maps one or more functions to one or more fields of an account data object from the application data of an application platform.

As discussed above, the synchronization instructions 206 perform the procedures required to synchronize application data between application platforms. Synchronization instructions 206 may comprise software instructions programmed or configured to perform flow 400 of FIG. 4, as further discussed herein. Synchronization instructions 206 may comprise software instructions programmed or configured to poll or query for application data such as entity data objects of specific entity types from external systems such as application platforms 102, 104, 106. The synchronization instructions 206 or connector may communicate with different application platforms 102, 104, 106 to retrieve application data comprising entity data objects of a specified type. A query may be issued to each of application platforms 102, 104, 106 to retrieve account entity data objects from each respective application platform 102, 104, 106. For example, query may be issued to retrieve all account entity data objects from application platforms 102, 104, 106. Once the application data is received, it may be stored in temporary storage associated with synchronization engine 114.

The synchronization instructions 206 may be programmed or configured to retrieve functions from rules & artificial intelligence libraries 210 and apply the functions to data objects. Such functions may include data manipulation functions and logic. The synchronization instructions 206 may be configured to detect and resolve conflicts between fields of data objects based on configuration rules that specify priority between fields of data objects. Such configuration rules may be stored in datastore 124 and managed by server computer 110.

The synchronization instructions 206 may be configured to generate synchronization data and transmit updates or modifications of application data to application platforms 102, 104, 106. Such data may be received by application platforms and used to update the respective platform's application data, and thus, synchronize the application data of the respective platform with application data of multiple other application platforms. Further configurations of the synchronization instructions 206 are discussed with respect to flow 400 of FIG. 4.

3. Example Functional Implementation

FIG. 4 shows an example flow 400 of a method for multi-directional synchronization of application data between application platforms.

Although the steps in FIG. 4 are shown in an order, the steps of FIG. 4 may be performed in any order and are not limited to the order shown in FIG. 4. Additionally, some steps may be optional, may be performed multiple times, or may be performed by different components. All steps, operations and functions of a flow diagram that are described herein are intended to indicate operations that are performed using programming in a special-purpose computer or general-purpose computer, in various embodiments. In other words, each flow diagram in this disclosure is a guide, plan or specification of an algorithm for programming a computer to execute the functions that are described. Furthermore, all steps of FIG. 4 are intended to describe machine executable instructions and not functions or operations in the abstract. The steps of flow 400 may be executed by the server computer of FIG. 1 as further described in this section.

At step 402, application data comprising a plurality of data objects associated with a plurality of application platforms is received. The plurality of data objects comprise a first data object associated with a first application platform of the plurality of application platforms and a second data object associated with a second application platform of the plurality of application platforms. For example, server computer 110 may receive the first data object from application platform 102. Server computer 110 may receive the second data object from application platform 104, which is different than application platform 102.

At step 404, using an object mapping, it is determined that the first data object and the second data object are mapped to a synchronization data object. The synchronization data object comprises a master data object that is configured to represent a synchronized state of the first data object and the second data object. In one embodiment, the synchronization data object comprises one or more fields that correspond to one or more fields of the first data object and one or more fields of the second data object. For example, the synchronization data object may include a 'Name' field that corresponds to: a 'Title' field of the first data object and a 'Name' field of the second data object. Different application platforms may use different nomenclatures to represent fields that correspond to the same core data element, e.g. 'Name' and 'Title' represent the same company name in the above example. As data objects from various application platforms are received, the synchronization data object is used as master data object that provides a basis for identifying and delivering updates to data objects that exist in various application platforms, as discussed herein.

The object mapping includes data that maps data objects from the plurality of application platforms to internally stored synchronization data objects. For example, the object mapping may specify that data objects from three different application platforms 102, 104, 106 are mapped to the same synchronization data object that is stored and managed by server computer 110 in datastore 124. The object mapping may also include data that maps specific fields of data objects from the plurality of application platforms to specific fields from synchronization data objects. For example, the object mapping may specify that a 'Name' field from the first data object and a 'Title' field from the second data object are mapped to a 'Company Name' field from the synchronization data object.

At step 406, using a function mapping, a first set of one or more functions that is mapped to the first data object and the second data object is determined. In response to determining the first set of one or more functions, the one or more functions of the first set are applied to the first data object and the second data object. The function mapping includes data that maps data objects to internally stored functions. Functions may be mapped to entire data objects or specific fields of data objects. For example, the function mapping may specify one or more functions that are stored and managed by server computer 110 in datastore 124 that are mapped to the first data object and the second data object. In one example, the first set of one or more functions includes a spellcheck function that when applied to a specific field of the first data object, identifies any spelling errors in the specific field and applies a modification to the specific field with the corrected spelling value. In another example, the first set of one or more functions includes a filtering function that when applied to the first data object and the second data object, scans fields and field values of the first and second data objects and applies filtering criteria to determine whether the synchronization process should halt or continue.

Other example functions may include functions that determine traffic patterns of external systems, functions that determine how often API calls are made to external systems, functions that determine how often API calls should be made to external systems to maximize efficiency of the polling of external systems. Additional functions such as machine learning based function are further discussed herein.

At step 408, a conflict is detected between one or more fields of the first data object and one or more fields of the second object. In response to detecting the conflict, the conflict is resolved based on configuration rules. In one embodiment, detecting a conflict comprises comparing a first field from the first data object to a second field from the second data object and determining that the first field is not equivalent to the second field. The fields that are compared for conflict detection may include the fields of each data object that are mapped to the same field in the synchronization data object. For example, if the object mapping indicates that that a 'Name' field from the first data object and a 'Title' field from the second data object are mapped to a 'Company Name' field from the synchronization data object, the 'Name' field from the first data object and the 'Title' field from the second data object are compared for conflict.

Configuration rules comprise one or more logical rules that indicate priority between fields of data objects of different application platforms. For example, a configuration rule may indicate that a 'Name' field of the first data object receives priority during conflict resolution. Thus, if a conflict is detected between the 'Name' field of the first data object and any other field from any other data object, the conflict is resolved in favor of the 'Name' field of the first data object based on the configuration rule. Resolving the conflict may comprise selecting, marking, or flagging the favorable data object or field of a data object as a winning record.

At step 410, the first data object and second data object are merged into a modified synchronization data object. The modified synchronization data object represents an updated version of the synchronization data object that includes changes or updates to one or more fields of the synchronization data object. In some embodiments, step 410 in performed in response to step 408. For example, resolving a conflict between a first field of the first data object and a second field of the second data object may include merging the first data object and second data object into the modified synchronization data object. The modified synchronization data object will include the priority field i.e. either the first field of the first data object or the second field of the second data object.

At step 412, a second set of one or more functions that is mapped to the modified synchronization data object is determined. In response to determining the second set of one or more functions, the one or more functions of the second set are applied to the modified synchronization data object. As discussed with respect to step 406 The function mapping includes data that maps data objects to internally stored functions. Functions may be mapped to entire data objects or specific fields of data objects. For example, the function mapping may specify one or more functions that are stored and managed by server computer 110 in datastore 124 that are mapped to the modified synchronization data object. In one example, the second set of one or more functions includes a spellcheck function that when applied to a specific field of the modified synchronization data object, identifies any spelling errors in the specific field and applies a modification to the specific field with the corrected spelling value. In another example, the second set of one or more functions includes a filtering function that when applied to the modified synchronization data object, scans fields and field values of the modified synchronization data object and applies filtering criteria to determine whether the synchronization process should halt or continue.

Figure 3:
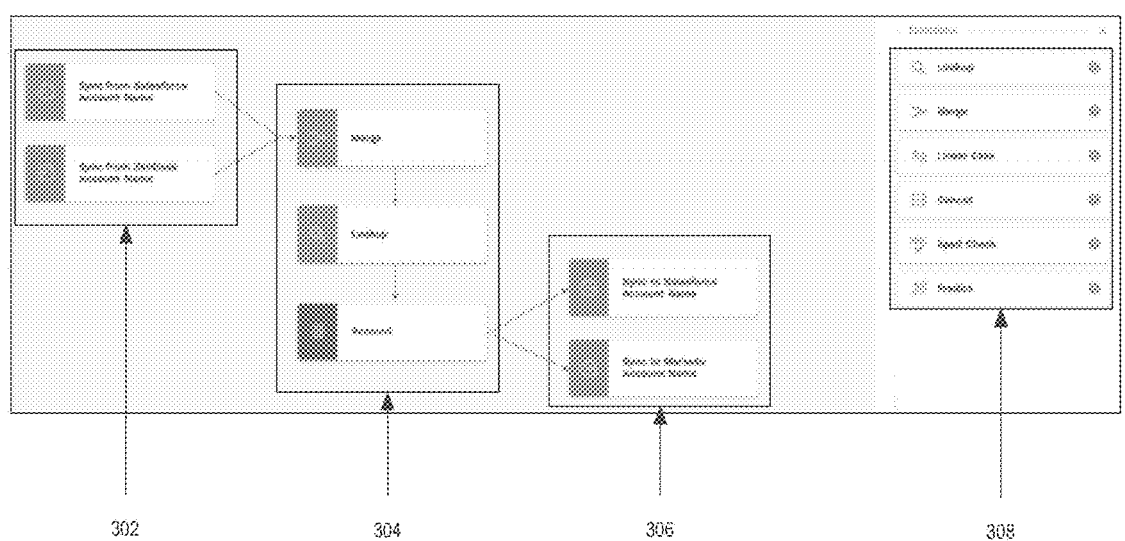
FIG. 3 illustrates a function mapping that maps application data to functions, according to an embodiment.

FIG. 3 illustrates a function mapping that maps functions to multiple data objects from application data. For example, the function mapping shows application data 302 received from multiple application platforms that specifies fields to be mapped. Application data 302 includes a Salesforce Account Name data field and a Zendesk Account Name data field. Field transformations 304 specifies functions that are to be applied to the data fields from application data 302 and a data object from the synchronization data where the results of the applied functions are to be stored. Field transformations 304 includes a merge function and lookup function, both of which are to be applied to the fields from application data 302. Once both functions are applied, the results are stored in an "Account" synchronization data object. The results are then propagated, i.e. synchronized, to the application platforms Salesforce and Marketo in synchronization 306. Functions 308 includes functions that are available to be applied to the application data 302. Such functions include lookup, merge, lower case, concatenation, spell check, and predict functions.

In an embodiment, the function mapping maps entire data objects or specific fields of data objects to one or more machine learning based functions. One or more machine learning based functions may include neural network functions, classifier functions, natural learning processing, or other machine learning models. Data objects from the application data and synchronization data can be used with machine learning functions to generate useful data points that can be transmitted to the connected application platforms as part of the synchronization process.

As a first example, a machine learning model may be trained using a training dataset to predict the behavior propensity of users or contacts to engage in specified activities.

In an embodiment, a training dataset may include one or more fields associated with a plurality of contact data objects received from the plurality of application platforms and one or more actions associated with each of the plurality of contact data objects. The training dataset may include features such as one or more fields of contact data objects. In one example, features may include first name, last name, email domain, company, industry of company, job title of person, demographic information. The training dataset may also include a target that includes one or more actions or activities. For example, a target may specify a binary value indicating whether a contact, represented by a contact data object, clicked on a link in an email at a particular time.

A machine learning model is trained using the training dataset. Once trained, the trained machine learning model may be used to generate a propensity value for an input contact data object that indicates how likely a contact represented by the particular contact data object is to engage in a certain action or activity. For example, the propensity value may indicate how likely a contact is to click on or engage with a link in an email. The propensity value can be propagated to application platforms such as Salesforce and Marketo where the propensity value is stored in application data for the respective platform such as a Salesforce account data field account or marketing field.

An algorithm used to train the machine learning model may comprise a Markov chain Monte Carlo (MCMC) algorithm. The MCMC algorithm used to train the machine learning model is used generate a probability value that indicates how likely a contact is to engage in a certain activity. Technical details and examples of MCMC are taught in the related reference "Markov Chain Monte Carlo in Python" located at towarddatascience.com As a second example, a machine learning model may be trained using a training dataset to predict customer sentiment that indicates a customer's satisfaction with a business or entity.

In an embodiment, a training dataset may include one or more fields associated with a plurality of ticket data objects received from the plurality of application platform as features. In one example, features may include comments on a ticket, a conversation between users relating to a ticket, and fields relating to user data objects related to the ticket or conversation. The training dataset may also include a target that specifies one or more sentiment values associated with each ticket data object. For example, a target may specify that comments on a ticket or conversation between users associated with a ticket is a positive or negative sentiment, represented by binary values or a score value.

A machine learning model is trained using the training dataset. Once trained, the trained machine learning model provides a sentiment score value that indicates how satisfied a customer is with a business or entity. The sentiment score can be stored in the synchronization data and then can be propagated to connected application platforms. For example, ticket data from Zendesk application platform can be processed using natural language processing (NLP) techniques discussed herein to produce a sentiment score. The sentiment score can be propagated to application platforms such as Salesforce and Marketo where the score is stored in application data for the respective platform such as a Salesforce account data field account or marketing field.

An algorithm used to train the machine learning model may comprise any classifier suitable for performing NLP. In some embodiments, a NLP toolkit can be used to train NLP models. Technical details and examples of a NLP took are taught in the related reference "Natural Language Toolkit" located at nltk.org As a third example, a machine learning model may be trained using a training dataset to perform segmentation (i.e. clustering) of synchronization data. In an embodiment, a training dataset may include one or more fields of synchronization data objects.

A machine learning model is trained using the training dataset. Once trained, the trained machine learning model provides data indicating membership in one or more clusters for each synchronization data object. An indication of cluster membership can be added to synchronization data objects as a new field and propagated to connected application platforms.

An algorithm used to train the machine learning model may comprise any unsupervised clustering algorithm such as K-Means, Mean Shift, or Agglomerative Hierarchical Clustering. The algorithm used to train the machine learning model is used generate a probability value that indicates how likely a contact is to engage in a certain activity.

At step 414, one or more modifications of the first data object are transmitted to the first application platform and/or one or more modifications of the second data object are transmitted to the second application platform. The one or more modifications of the first and second data object are generated based on transaction log data. Transaction log data comprises data that indicates one or more modifications or changes between the synchronization data object and the modified synchronization data object. For example, the transaction log data may indicate that a field 'Name' that indicates a value of 'Syncari' from the synchronization data object was changed to a value of 'Syncari Inc.' in the modified synchronization data object. Such modifications or changes indicated by the transaction log data can be compared against the first data object and the second data object to generate one or more modifications of the first data object and/or one or more modifications of the second data object and transmit the one or more modifications to the respective application platforms to complete the synchronization process.

In some embodiments, step 414 is optionally performed. For example, it is not necessary to always transmit modifications to application platforms.

In some embodiments, only one of the first data object and the second data object will be modified. For example, if it is determined based on the transaction log data that a modification or change was made to the 'Name' field of the synchronization data object, and that the modification was made as a result of the first data object having priority over the 'Name' field, the modification is not transmitted to the first application platform that manages the first data object because the respective field is already up to date. Since the field of the first data object is up to date, the modification is only transmitted to the second application platform to update the respective field of the second data object that is managed by the second application platform. This saves computing resources by not making an API call to transmit an update to an application platform when an update is not needed.

In an embodiment, one or more modifications to data objects are encapsulated in API calls to application platforms. For example, one or more modifications to the first data object of the first application platform may comprise a specific API call, that, when executed by server computer 110, causes updating one or more fields of the first data object by the first application platform 102. Such API calls may be generated based on a schema mapping or application graph 208 that provides API call templates for each application platform so that API calls including modifications to specific fields can automatically be generated and executed by server computer 110.

In some embodiments, one or more fields of the modified synchronization data object are transmitted to a particular application platform of the plurality of application platforms that is different than the first application platform and second application platform. That is, one or more fields of the modified synchronization data object can be propagated to application platforms that are not initially queried for data objects or updates to particular data objects.

As discussed above with respect to flow 400, by continuously polling or querying for changes to application data from multiple application platforms and applying logic and rules provided by the synchronization engine 114, data objects from the synchronization data that are mapped to data objects from one or more different application platforms are updated and transformed to represent a source of truth for similar data objects that exist in multiple application platforms. The synchronization data is then propagated to the one or more different application platforms to complete a synchronization cycle.

Using techniques discussed herein, an efficient synchronization process that synchronizes application data between multiple application platforms is provided. Using a synchronization engine as a point of centrality between multiple application platforms allows application platforms to minimize the amount of API calls to other application platforms to perform synchronization of application data. Instead of an application platform communicating individually with each application platform of multiple application platforms to perform synchronization, techniques discussed herein only require that an application platform communicate with a single synchronization engine. These techniques result in a significant reduction in API calls and other computing resources devoted to performing synchronization of application data between multiple application platforms.

4. Hardware Overview

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 5:
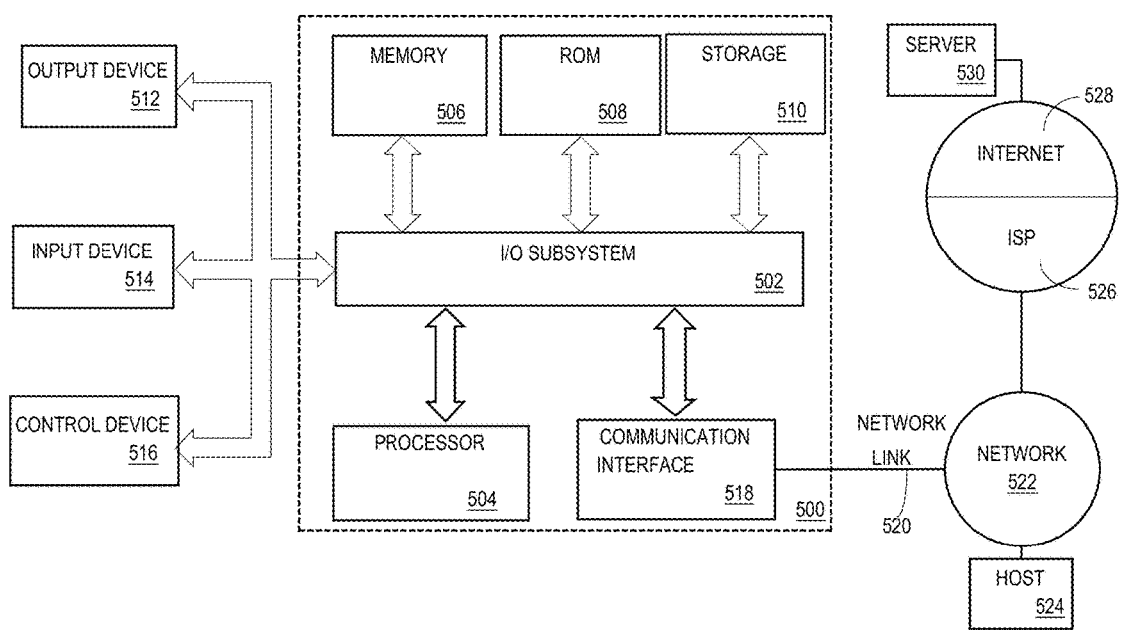
FIG. 5 illustrates an example computer system, according to an embodiment.

FIG. 5 is a block diagram that illustrates an example computer system with which an embodiment may be implemented. In the example of FIG. 5, a computer system 500 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 500 includes an input/output (I/O) subsystem 502 which may include a bus and/or other communication mechanism(s) for communicating information and/or instructions between the components of the computer system 500 over electronic signal paths. The I/O subsystem 502 may include an I/O controller, a memory controller and at least one I/O port. The electronic signal paths are represented schematically in the drawings, for example as lines, unidirectional arrows, or bidirectional arrows.

At least one hardware processor 504 is coupled to I/O subsystem 502 for processing information and instructions. Hardware processor 504 may include, for example, a general-purpose microprocessor or microcontroller and/or a special-purpose microprocessor such as an embedded system or a graphics processing unit (GPU) or a digital signal processor or ARM processor. Processor 504 may comprise an integrated arithmetic logic unit (ALU) or may be coupled to a separate ALU.

Computer system 500 includes one or more units of memory 506, such as a main memory, which is coupled to I/O subsystem 502 for electronically digitally storing data and instructions to be executed by processor 504. Memory 506 may include volatile memory such as various forms of random-access memory (RAM) or other dynamic storage device. Memory 506 also may be used for storing temporary variables or other intermediate information during execution of instructions to be executed by processor 504. Such instructions, when stored in non-transitory computer-readable storage media accessible to processor 504, can render computer system 500 into a special-purpose machine that is customized to perform the operations specified in the instructions.

Computer system 500 further includes non-volatile memory such as read only memory (ROM) 508 or other static storage device coupled to I/O subsystem 502 for storing information and instructions for processor 504. The ROM 508 may include various forms of programmable ROM (PROM) such as erasable PROM (EPROM) or electrically erasable PROM (EEPROM). A unit of persistent storage 510 may include various forms of non-volatile RAM (NVRAM), such as FLASH memory, or solid-state storage, magnetic disk or optical disk such as CD-ROM or DVD-ROM, and may be coupled to I/O subsystem 502 for storing information and instructions. Storage 510 is an example of a non-transitory computer-readable medium that may be used to store instructions and data which when executed by the processor 504 cause performing computer-implemented methods to execute the techniques herein.

The instructions in memory 506, ROM 508 or storage 510 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 500 may be coupled via I/O subsystem 502 to at least one output device 512. In one embodiment, output device 512 is a digital computer display. Examples of a display that may be used in various embodiments include a touch screen display or a light-emitting diode (LED) display or a liquid crystal display (LCD) or an e-paper display. Computer system 500 may include other type(s) of output devices 512, alternatively or in addition to a display device. Examples of other output devices 512 include printers, ticket printers, plotters, projectors, sound cards or video cards, speakers, buzzers or piezoelectric devices or other audible devices, lamps or LED or LCD indicators, haptic devices, actuators or servos.

At least one input device 514 is coupled to I/O subsystem 502 for communicating signals, data, command selections or gestures to processor 504. Examples of input devices 514 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 516, which may perform cursor control or other automated control functions such as navigation in a graphical interface on a display screen, alternatively or in addition to input functions. Control device 516 may be a touchpad, a mouse, a trackball, or cursor direction keys for communicating direction information and command selections to processor 504 and for controlling cursor movement on display 512. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 514 may include a combination of multiple different input devices, such as a video camera and a depth sensor.

In another embodiment, computer system 500 may comprise an internet of things (IoT) device in which one or more of the output device 512, input device 514, and control device 516 are omitted. Or, in such an embodiment, the input device 514 may comprise one or more cameras, motion detectors, thermometers, microphones, seismic detectors, other sensors or detectors, measurement devices or encoders and the output device 512 may comprise a special-purpose display such as a single-line LED or LCD display, one or more indicators, a display panel, a meter, a valve, a solenoid, an actuator or a servo.

When computer system 500 is a mobile computing device, input device 514 may comprise a global positioning system (GPS) receiver coupled to a GPS module that is capable of triangulating to a plurality of GPS satellites, determining and generating geo-location or position data such as latitude-longitude values for a geophysical location of the computer system 500. Output device 512 may include hardware, software, firmware and interfaces for generating position reporting packets, notifications, pulse or heartbeat signals, or other recurring data transmissions that specify a position of the computer system 500, alone or in combination with other application-specific data, directed toward host 524 or server 530.

Computer system 500 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 500 in response to processor 504 executing at least one sequence of at least one instruction contained in main memory 506. Such instructions may be read into main memory 506 from another storage medium, such as storage 510. Execution of the sequences of instructions contained in main memory 506 causes processor 405 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 510. Volatile media includes dynamic memory, such as memory 506. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 502. Transmission media can also take the form of acoustic or light waves, such as those generated during radio-wave and infra-red data communications.

Various forms of media may be involved in carrying at least one sequence of at least one instruction to processor 504 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 500 can receive the data on the communication link and convert the data to a format that can be read by computer system 500. For instance, a receiver such as a radio frequency antenna or an infrared detector can receive the data carried in a wireless or optical signal and appropriate circuitry can provide the data to I/O subsystem 502 such as place the data on a bus. I/O subsystem 502 carries the data to memory 506, from which processor 504 retrieves and executes the instructions. The instructions received by memory 506 may optionally be stored on storage 510 either before or after execution by processor 504.

Computer system 500 also includes a communication interface 518 coupled to bus 502. Communication interface 518 provides a two-way data communication coupling to network link(s) 520 that are directly or indirectly connected to at least one communication networks, such as a network 522 or a public or private cloud on the Internet. For example, communication interface 518 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 522 broadly represents a local area network (LAN), wide-area network (WAN), campus network, internetwork or any combination thereof. Communication interface 518 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 518 sends and receives electrical, electromagnetic or optical signals over signal paths that carry digital data streams representing various types of information.

Network link 520 typically provides electrical, electromagnetic, or optical data communication directly or through at least one network to other data devices, using, for example, satellite, cellular, Wi-Fi, or BLUETOOTH technology. For example, network link 520 may provide a connection through a network 522 to a host computer 524.

Furthermore, network link 520 may provide a connection through network 522 or to other computing devices via internetworking devices and/or computers that are operated by an Internet Service Provider (ISP) 526. ISP 526 provides data communication services through a world-wide packet data communication network represented as internet 528. A server computer 530 may be coupled to internet 528. Server 530 broadly represents any computer, data center, virtual machine or virtual computing instance with or without a hypervisor, or computer executing a containerized program system such as DOCKER or KUBERNETES. Server 530 may represent an electronic digital service that is implemented using more than one computer or instance and that is accessed and used by transmitting web services requests, uniform resource locator (URL) strings with parameters in HTTP payloads, API calls, app services calls, or other service calls. Computer system 500 and server 530 may form elements of a distributed computing system that includes other computers, a processing cluster, server farm or other organization of computers that cooperate to perform tasks or execute applications or services. Server 530 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 530 may comprise a web application server that hosts a presentation layer, application layer and data storage layer such as a relational database system using structured query language (SQL) or no SQL, an object store, a graph database, a flat file system or other data storage.

Computer system 500 can send messages and receive data and instructions, including program code, through the network(s), network link 520 and communication interface 518. In the Internet example, a server 530 might transmit a requested code for an application program through Internet 528, ISP 526, local network 522 and communication interface 518. The received code may be executed by processor 504 as it is received, and/or stored in storage 510, or other non-volatile storage for later execution.

The execution of instructions as described in this section may implement a process in the form of an instance of a computer program that is being executed, and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 504. While each processor 504 or core of the processor executes a single task at a time, computer system 500 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/ private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DBaaS provider manages or controls the underlying cloud infrastructure, applications, and servers, including one or more database servers.

5. Extensions and Alternatives

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

As used herein the terms "include" and "comprise" (and variations of those terms, such as "including", "includes", "comprising", "comprises", "comprised" and the like) are intended to be inclusive and are not intended to exclude further features, components, integers or steps.

Various operations have been described using flowcharts. In certain cases, the functionality/processing of a given flowchart step may be performed in different ways to that described and/or by different systems or system modules. Furthermore, in some cases a given operation depicted by a flowchart may be divided into multiple operations and/or multiple flowchart operations may be combined into a single operation. Furthermore, in certain cases the order of operations as depicted in a flowchart and described may be able to be changed without departing from the scope of the present disclosure.

It will be understood that the embodiments disclosed and defined in this specification extends to all alternative combinations of two or more of the individual features mentioned or evident from the text or drawings. All of these different combinations constitute various alternative aspects of the embodiments.

What is claimed is:

1. A computer-implemented method comprising:
receiving, at a server computer, application data comprising a plurality of data objects associated with a plurality of application platforms, the plurality of data objects comprising a first data object associated with a first application platform of the plurality of application platforms and a second data object associated with a second application platform of the plurality of application platforms;
using an object mapping, determining that the first data object and the second data object are mapped to a synchronization data object of a plurality of synchronization data objects, the synchronization data object comprising a master data object that is configured to: represent a synchronized state of the first data object and the second data object and include one or more fields that correspond to one or more fields of the first data object and one or more fields of the second data object;
using a function mapping, determining a first set of one or more functions that are mapped to the first data object and the second data object;
in response determining the first set of one or more functions, applying the first set of one or more functions to the first data object and the second data object;
detecting a conflict between one or more fields of the first data object and one or more fields of the second data object;
in response to detecting the conflict, resolving the conflict based on configuration rules;
merging the first data object and second data object into a modified synchronization data object that represents an updated version of the synchronization data object;
using the function mapping, determining a second set of one or more functions that are mapped to the modified synchronization data object;
in response to determining the second set of one or more functions, applying the second set of one or more functions to the modified synchronization data object;
transmitting at least one of: one or more modifications of the first data object to the first application platform or one or more modifications of the second data object to the second application platform.

2. The method of claim 1, wherein the object mapping comprises data that maps the plurality of data objects associated with the plurality of application platforms to the plurality of synchronization data objects.

3. The method of claim 1, wherein the first set of one or more functions is applied to one or more fields of the first data object and one or more fields of the second data object.

4. The method of claim 1, wherein the first set of one or more functions includes a spellcheck function that is applied to the first data object and the second data object.

5. The method of claim 1, wherein the configuration rules indicate a priority between the one or more fields of the first data object and the one or more fields of the second data object.

6. The method of claim 1, wherein the modified synchronization data object includes changes to one or more fields of the synchronization data object.

7. The method of claim 1, wherein the second set of one or more functions includes a machine learning based function that is applied to the modified synchronization data object.

8. The method of claim 1, further comprising:
creating a training dataset comprising one or more fields associated with a plurality of contact data objects received from the plurality of application platforms and one or more actions associated with each contact data object of the plurality of contact data objects;
training a machine learning model using the training dataset, the trained machine learning model providing a propensity value that indicates how likely a contact is to engage in an activity;
transmitting the propensity value to at least one application platform of the plurality of application platforms.

9. The method of claim 1, further comprising:
creating a training dataset comprising one or more fields associated with a plurality of ticket data objects received from the plurality of application platforms and one or more sentiment values associated with each ticket data object of the plurality of ticket data objects;
training a machine learning model using the training dataset, the trained machine learning model providing a sentiment score value that indicates how satisfied a customer is with a business or entity;
transmitting the sentiment value to at least one application platform of the plurality of application platforms.

10. The method of claim 1, further comprising:
determining the one or more modifications of the first data object and the one or more modifications of the second data object based on transaction log data that indicates changes between the synchronization data object and the modified synchronization data object.

11. A computer system comprising:
one or more processors;
one or more memories storing instructions which, when executed by the one or more processors, cause:
receiving application data comprising a plurality of data objects associated with a plurality of application platforms, the plurality of data objects comprising a first data object associated with a first application platform of the plurality of application platforms and a second data object associated with a second application platform of the plurality of application platforms;
using an object mapping, determining that the first data object and the second data object are mapped to a synchronization data object of a plurality of synchronization data objects, the synchronization data object comprising a master data object that is configured to: represent a synchronized state of the first data object and the second data object and include one or more fields that correspond to one or more fields of the first data object and one or more fields of the second data object;
using a function mapping, determining a first set of one or more functions that are mapped to the first data object and the second data object;
in response to determining the first set of one or more functions, applying the first set of one or more functions to the first data object and the second data object;
detecting a conflict between one or more fields of the first data object and one or more fields of the second object; and
in response to detecting the conflict, resolving the conflict based on configuration rules;
merging the first data object and second data object into a modified synchronization data object that represents an updated version of the synchronization data object;
using the function mapping, determining a second set of one or more functions that are mapped to the modified synchronization data object;
in response determining the second set of one or more functions, applying the second set of one or more functions to the modified synchronization data object;
transmitting at least one of: one or more modifications of the first data object to the first application platform or one or more modifications of the second data object to the second application platform.

12. The computer system of claim 11, wherein the object mapping comprises data that maps the plurality of data objects associated with the plurality of application platforms to the plurality of synchronization data objects.

13. The computer system of claim 11, wherein the first set of one or more functions is applied to one or more fields of the first data object and one or more fields of the second data object.

14. The computer system of claim 11, wherein the first set of one or more functions includes a spellcheck function that is applied to the first data object and the second data object.

15. The computer system of claim 11, wherein the configuration rules indicate a priority between the one or more fields of the first data object and the one or more fields of the second data object.

16. The computer system of claim 11, wherein the modified synchronization data object includes changes to one or more fields of the synchronization data object.

17. The computer system of claim 11, wherein the second set of one or more functions includes a machine learning based function that is applied to the modified synchronization data object.

18. The computer system of claim 11, the instructions, when executed by the one or more processors, cause:
creating a training dataset comprising one or more fields associated with a plurality of contact data objects received from the plurality of application platforms and one or more actions associated with each contact data object of the plurality of contact data objects;
training a machine learning model using the training dataset, the trained machine learning model providing a propensity value that indicates how likely a contact is to engage in an activity;
transmitting the propensity value to at least one application platform of the plurality of application platforms.

19. The computer system of claim 11, the instructions, when executed by the one or more processors, cause:
creating a training dataset comprising one or more fields associated with a plurality of ticket data objects received from the plurality of application platforms and one or more sentiment values associated with each ticket data object of the plurality of ticket data objects;
training a machine learning model using the training dataset, the trained machine learning model providing a sentiment score value that indicates how satisfied a customer is with a business or entity;
transmitting the sentiment value to at least one application platform of the plurality of application platforms.

20. The computer system of claim 11, the instructions, when executed by the one or more processors, cause:
determining the one or more modifications of the first data object and the one or more modifications of the second data object based on transaction log data that indicates changes between the synchronization data object and the modified synchronization data object.

* * * * *